April 8, 1930.  H. A. WOOFTER  1,753,492
WELDING APPARATUS
Filed June 1, 1926
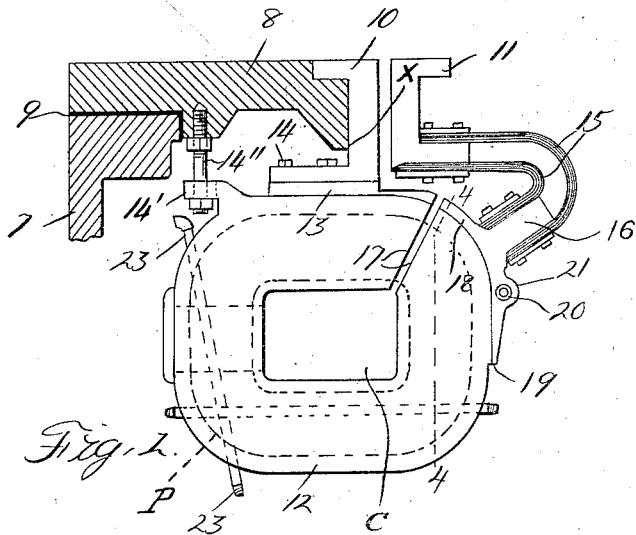
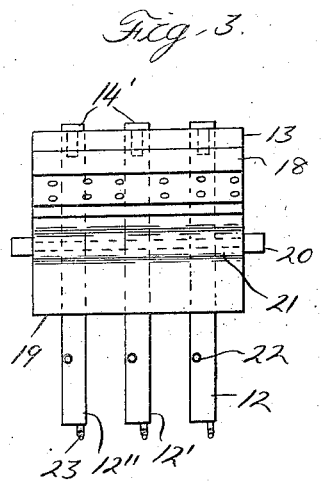
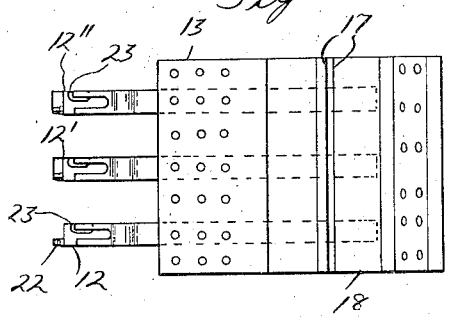
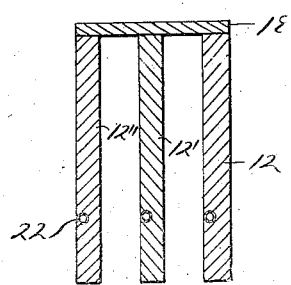
Inventor
Herbert A. Woofter
By Whittemore Hulbert Whittemore
+ Belknap
Attorneys Patented Apr. 8, 1930

1,753,492

UNITED STATES PATENT OFFICE

HERBERT A. WOOFTER, OF KENTON, OHIO, ASSIGNOR TO SWIFT ELECTRIC WELDER COMPANY, OF DETROIT, MICHIGAN, A CORPORATION OF MICHIGAN

WELDING APPARATUS

Application filed June 1, 1926. Serial No. 112,966.

This invention relates to welding apparatus and more especially to improvements in the general construction thereof.

Since the inception of welding apparatus difficulty has been experienced in protecting the primary coils from the metallic particles and other foreign matter deposited by and during the welding of the parts. The primary coils create or set up a magnetic field of considerable force and strength which acts to directly attract and draw the aforesaid metal particles thereto. While the primary coils are ordinarily protected by the customary insulation, this affords but a meager protection against the hot metal particles drawn thereto which, after a short period of use of the apparatus, burns through this insulating covering to cause a short circuit of the coils and as a consequence either impairs the efficiency of the apparatus or renders the same totally inoperative.

Efforts have heretofore been made to protect these coils in one way and another with but slight success. In the absence of some satisfactory means of protecting the primary coils great care must be exercised to keep these coils free from the aforesaid foreign matter and as this requires time on the part of the operator, the efficiency of the apparatus from a production standpoint is accordingly decreased.

It is therefore one of the important objects of this present invention to provide a shield or the like constituting a protective covering for the primary coils and further to utilize the secondary casting or coil as a convenient means for mounting and supporting this protective covering.

Furthermore the invention contemplates a construction providing means for entirely supporting the secondary coil by and from the insulated stationary platen of the welding apparatus or from a corresponding fixed part of the machine. Several advantages are attained by such an arrangement. For instance, by supporting a secondary coil in this manner there is no movement whatsoever between the secondary parts to cause chafing while in operation which would ordinarily result in the failure of the primary coils.

Furthermore, with such an arrangement the secondary coil is kept away from the removable core, thus preventing grounds and short circuits from the secondary coil to the core and facilitating the removal of the removable member of the core when desired.

Heretofore difficulty has also been experienced in producing a simple and satisfactory circulatory conduit or passage for the cooling medium for the secondary casting which because of the heat induced therein must be cooled for the purposes of protection and efficiency. With heretofore known apparatus, the conduits or passages for the cooling medium, which are usually formed or provided in the coil when the same is cast, were of such a character as to make it practically impossible to clean or free the same of foreign matter in the event they became choked or stopped up. With such apparatus, when a condition such as this arose, it was necessary to remove the entire secondary casting, to repair the same or to replace it with a new one. Obviously this is not only inefficient but expensive.

Therefore this present invention contemplates as another of its objects, to provide a cooling medium circulatory system including one or more straight conduits or passages for the cooling medium opening at substantially opposite points at the peripheral edge of the coil so that in the event these conduits become choked and the cooling system consequently inoperative, the foreign matter may be removed quickly and easily by drilling.

In addition to those mentioned above, the invention contemplates other objects, advantages and novel details of construction, all of which will be made more apparent as this description proceeds especially when considered in connection with the accompanying drawings, wherein Figure 1 is a fragmentary side elevation of a welding apparatus with a secondary casting or coil constructed in accordance with this invention.

Figure 2 is a top plan view of the coil structure illustrated in Figure 1.

Figure 3 is an end elevation of the coil and

Figure 4 is a vertical transverse sectional view taken substantially on the plane indicated by line 4—4 of Figure 1.

Referring now particularly to the drawings wherein an illustrated embodiment of the invention is shown somewhat in detail, it will be noted that there is fragmentarily illustrated a welding machine having a frame 7, a stationary platen 8, insulated from the frame by insulation 9 and terminal blocks 10 and 11 having a direct electrical connection with the secondary coil 12. The terminal block 10 as shown is rockably supported upon the platen 8 and acts as a partial support for the secondary coils, being attached thereto through the intermediary of a transversely extending member 13 and bolts 14. In this connection it will be noted that the illustrative embodiment of the invention shown in the drawings contemplates, in addition to the secondary coil 12 shown in side elevation in Figure 1, two similar coils 12′ and 12″ arranged coaxially and in spaced relation to the coil 12. The other terminal block 11 is movably supported, as is customary in apparatus of this character upon a part of the welding machine, not shown, and is electrically connected by means of leads 15 to a lug 16 projecting from the coil. The reference character 17 indicates the spaced ends of the secondary coil 12.

Each or selected ones of the coils 12, 12′ and 12″ are provided with lugs 14′ apertured or slotted for engagement by bolts 14″ threaded into the platen 8. Thus the secondary coil is entirely supported from the stationary platen by means of these elements 14″ and the connection with the terminal block 10. By adjusting the elements 14″, the terminal block 10 may be rocked on its support (the block 10 turning about the point X) to vary its engagement with the work (not shown).

Arranged around a part of the outer periphery of the secondary coils and extending transversely of and spanning the space therebetween, is a cover or shield 18 which in the embodiment of the invention herein shown, is cast integrally with the coil portions 12, 12′ and 12″, inasmuch as this embodiment contemplates a cast metal construction. The shield or cover 18, as illustrated, extends beyond the coils 12 and 12″ to a point substantially coincident with the ends of the member 13. This shield also starts at a point substantially vertically coincident with the adjacent edge 17 of the coil and extends peripherally thereof preferably to a point 19 below the axis of the coils. The lug or lugs 16 aforedescribed as shown form an integral part of the shield 18. This shield not only acts to unite the coil members 12, 12′ and 12″ in proper spaced relation and to produce a unitary construction but also affords a protective covering for the primary coils P of the apparatus shown semi-diagrammatically in Figure 1.

By the above described construction it is possible to entirely support the secondary coil from the stationary platen 8 so that it will not rest upon the core C, thereby eliminating the possibility or danger of short circuits due to contact with the core or burn-outs of the primary coil due to chafing. Where the secondary coil is fixedly mounted as in accordance with the present disclosure, possibility of any relative movement of the parts of the transformer is eliminated and consequently no chafing or working-in of metal particles thrown off while welding occurs.

A cooling medium may be circulated through the shield 18 by means of a passageway or conduit 20 extending longitudinally of the shield and as shown transversely of the coils. In practice it may be found necessary or desirable to form the shield 18 with a semi-circular enlargement 21 to provide sufficient material to accommodate the passageway or conduit 20. It will be noted that this passageway extends in a straight line from one edge or end of the shield 18 to the other.

One or more additional conduits or passages for the cooling medium may be provided in the body of each of the coils and in practice it has been found that two of such conduits, indicated herein by the reference characters 22 and 23, operate with the desired efficiency. It will be noted that conduit 22 extends substantially horizontally through the lower portion of each of the coils, substantially parallel with the faces thereof from one peripheral edge portion to a substantially diametrically opposed peripheral edge portion. The conduit 23 is shown as extending in a substantially vertical direction from the lower edge of each coil to a point adjacent the upper edge thereof. It will be noted that both of these conduits 22 and 23 are straight or provided with aligned ends whereby the opening therethrough may be cleared by drilling as aforesaid if the necessity arises. A suitable connection with cooling fluid supply and drain pipes will be effected so that when the coils are in use a cooling medium such as water may be continuously circulated therethrough.

By locating the core, secondary and primary coils at the extreme left hand end of the welder, these elements are out of alignment with the gap between the terminal blocks 10 and 11 and consequently substantially out of the path of the hot slag metal particles deposited during welding. Such slag is therefore deflected away from the transformer by means of the guard or screen 18. It is an important contemplation of this invention which provides for a construction wherein it is possible to mount the transformer to one side of the welding line and further to locate the transformer adjacent, and support the same from, the stationary insulated left hand end of the machine.

Obviously the secondary casting may comprise any desired number of coil portions 12 as the character of the welding apparatus dictates or demands but in each instance the casting will have, as a part thereof, the shield portion aforedescribed. It is apparent also that the cooling fluid conduits 22 and 23 are duplicated in each coil portion 12 while the length of the cooling fluid conduit 20 will be altered in accordance with the length of the shield 18.

Inasmuch as the invention is capable of various alterations, changes and rearrangement of parts, reservation is made to make such changes as may come within the purview of the accompanying claims.

What I claim as my invention is:

1. In a welding apparatus, the combination with primary and secondary coils, of an element constituting a protective covering for said primary coil integrally associated with said secondary coil, said element constituting a portion of the secondary circuit.

2. In a welding appartus, the combination with primary coils of a secondary casting having secondary coil portions associated with said primary coils and a transversely extending portion constituting a protective cover for said primary coils and a reinforcement for said secondary coil portions.

3. In a welding apparatus, the combination with primary coils of a secondary casting having secondary coil portions associated with said primary coils and a portion connecting said coil portions and constituting a protective cover for said primary coils.

4. In apparatus of the character described, an integral secondary coil formed with a cover element having a straight circulatory passage for a cooling medium, the said passage having aligned ends whereby it may be cleaned by drilling.

5. In apparatus of the character described, an integral secondary coil and a cover element formed with a straight circulatory passage for a cooling medium, extending from one peripheral edge of the cover to a substantially opposed peripheral edge, the inlet and outlet of the said passage being in alignment whereby a drill may be passed through the passage to clean the same.

6. In apparatus of the character described, a cast metal secondary coil and a cover element formed with a straight passage therethrough substantially parallel with the face of the cover and opening at the edge thereof.

7. A welding apparatus including in combination, a secondary coil, a terminal block rigidly connected to said coil, said terminal block being adapted to engage a piece of work, a platen, and means supporting said secondary coil from said platen, said means being adjustable to vary the engagement of the terminal block with the work.

8. A welding apparatus including in combination, a secondary coil, a terminal block rigidly connected to said coil, said terminal block being adapted to engage a piece of work, a platen, and means supporting said secondary coil from said platen, said means including a member threadedly engageable with the said platen whereby the said member may be adjusted to move the said secondary coil relative to the platen and to vary the engagement of the terminal block with the work.

9. A welding apparatus including in combination, a platen, a secondary coil, a terminal block rigidly connected to the said secondary coil, the said terminal block having a portion rockably engageable with the said platen, and means supporting the said secondary coil from the platen, said means including a member threadedly engageable with the said platen, whereby the said member may be adjusted to move the said secondary coil and to rock the said terminal block on the platen.

10. In a welding machine, a primary coil, a secondary coil in inductive relation therewith, said secondary coil including a plurality of spaced sections, and a cover element for shielding said primary coil from flying metal, said cover element being supported by said secondary coil and being adapted to maintain the sections of said secondary coil in fixed spaced relation to each other.

11. In a welding machine, a combination of a primary coil and a secondary coil in inductive relation therewith, said secondary coil consisting of a plurality of spaced sections, and a conducting element rigidly secured to the several sections of said secondary coil and extending over a considerable part thereof whereby said primary coil is shielded from flying metal and said secondary sections are held in fixed relative position.

12. In a welding machine, a combination of a primary coil and a secondary coil in inductive relation therewith, said secondary coil consisting of a plurality of spaced turns, each turn terminating with its end in a common plane, and a conducting element rigidly secured to the several turns near the ends thereof and extending over a considerable part thereof whereby said primary coil is shielded from flying metal and said secondary turns are held in fixed relative position.

In testimony whereof I affix my signature.

HERBERT A. WOOFTER.